US007028556B2

(12) United States Patent
Powell

(10) Patent No.: US 7,028,556 B2
(45) Date of Patent: Apr. 18, 2006

(54) LOAD ACQUISITION FOR MACHINE CLAMP REGISTRIES

(75) Inventor: Baden Michael Powell, Windsor (CA)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/929,111

(22) Filed: Aug. 15, 2001

(65) Prior Publication Data

US 2003/0033887 A1    Feb. 20, 2003

(51) Int. Cl.
*G01N 3/02* (2006.01)

(52) U.S. Cl. ...................................................... 73/856

(58) Field of Classification Search ............... 73/6, 73/860, 760, 856; 108/57.25, 57.34
See application file for complete search history.

(56) References Cited

U.S. PATENT DOCUMENTS

| 3,661,099 | A | * | 5/1972 | Shelor ..................... 108/57.34 |
| 4,332,175 | A | * | 6/1982 | Krainski, Jr. ................ 73/825 |
| 4,718,281 | A | * | 1/1988 | Crews, Jr. .................... 73/794 |
| 5,219,264 | A | * | 6/1993 | McClure et al. ............ 414/730 |
| 6,078,874 | A | * | 6/2000 | Piety et al. ................. 702/122 |

* cited by examiner

*Primary Examiner*—Max Noori
(74) *Attorney, Agent, or Firm*—Christopher DeVries

(57) ABSTRACT

A method and apparatus for monitoring clamp loads used to clamp production pallets in position in a transfer machining line is disclosed. The steps include substituting a test pallet for a production pallet during a production cycle. The test pallet includes at least one load cell located at a respective clamp portion. The next step is to detect when the test pallet is at the machining station and ready to be clamped. The test pallet is then clamped at its clamp portion having the load cell. Clamp load data is collected and stored in a data collector located on-board the test pallet. This data may be downloaded at the end of the cycle in a readable format.

15 Claims, 2 Drawing Sheets

LOAD ACQUISITION FOR MACHINE CLAMP REGISTRIES

TECHNICAL FIELD

The present invention is for a method and apparatus for measuring clamping loads in a machining station, particularly at each station of a transfer line.

BACKGROUND OF THE INVENTION

In a production environment, a transfer line may be employed to move a part through a series of machining operating stations. Alternatively, single machining stations may be used where several machining operations are performed on a part. In either situation, clamps hold the part or transfer pallets in a fixed position during machining. The clamp force may be generated from various sources such as springs or hydraulics. Maintaining the proper clamp force is critical to ensure consistent quality and safety of the machining operations.

The clamp force may be checked through manual intervention. For example, a machine operator may use a pry bar to subjectively test the force resistance of each clamp arm. No objective force readings may be obtained. In addition, this method is both time and labor intensive, as well as disruptive to production. Alternatively, an operator may install a load cell on each individual clamp arm and manually record the displayed reading. This process is extremely time consuming and impractical for a high volume manufacturing environment.

SUMMARY OF THE INVENTION

Accordingly, the present invention provides a method and apparatus for monitoring clamp loads used to clamp production pallets in position in a transfer machining line. The method may be used as a preventative maintenance procedure before low or no clamp loads adversely impact part quality.

The steps of the method include substituting a test pallet for a production pallet during a production cycle. The test pallet includes at least one load cell located to align with a respective clamp registry on the machine. The next step is to detect when the test pallet is at the machining station and ready to be clamped. The test pallet is then clamped at its clamp position having the load cell. Clamp load data is collected and stored in a data collector located on-board the test pallet. This data may be downloaded at the end of the cycle in a readable electronic format.

The present invention may also be used in a non-transfer line situation where a production part is loaded into a machine without employing a transfer pallet. In this instance a test part, analogous to the test pallet, is substituted for the production part. The test part is configured like the production part with load cells installed at each of the clamp registry locations for gathering clamp load data.

DESCRIPTION OF THE PREFERRED EMBODIMENT

The present invention provides a method and apparatus for monitoring the clamp loads used to clamp either a pallet holding a part or to clamp the part itself in position for machining at one or more machining stations. In a transfer line, a pallet holds the part to be machined and moves with the part from station to station in sequence. In a non-transfer line situation, the part itself may be loaded in each machining station with registry clamps clamping directly on the part as in a CNC machining center. The present invention applies equally to both scenarios, but will be described first with reference to a pallet employed in a transfer line.

Figure 2:
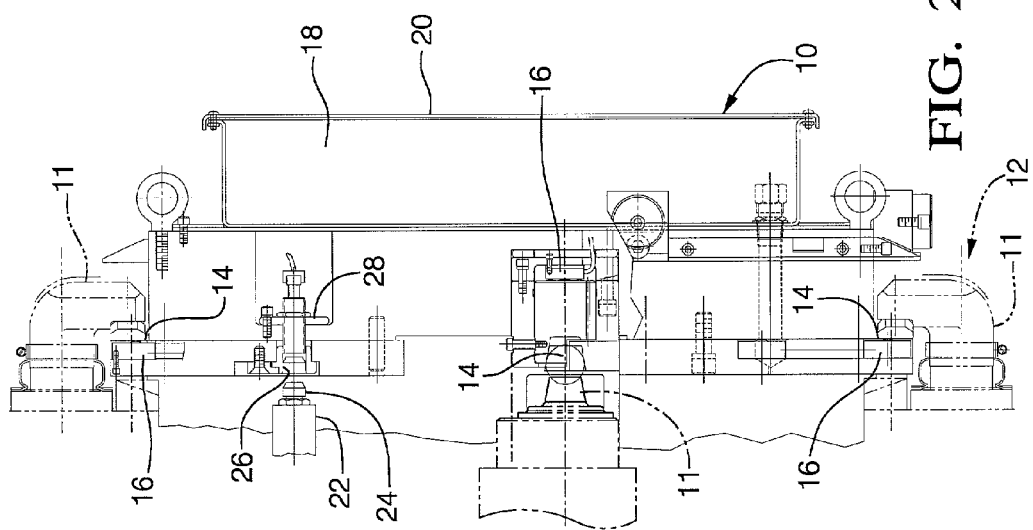
FIG. 2 is a schematic side view of the test pallet with a portion of the machining station in phantom.
Figure 1:
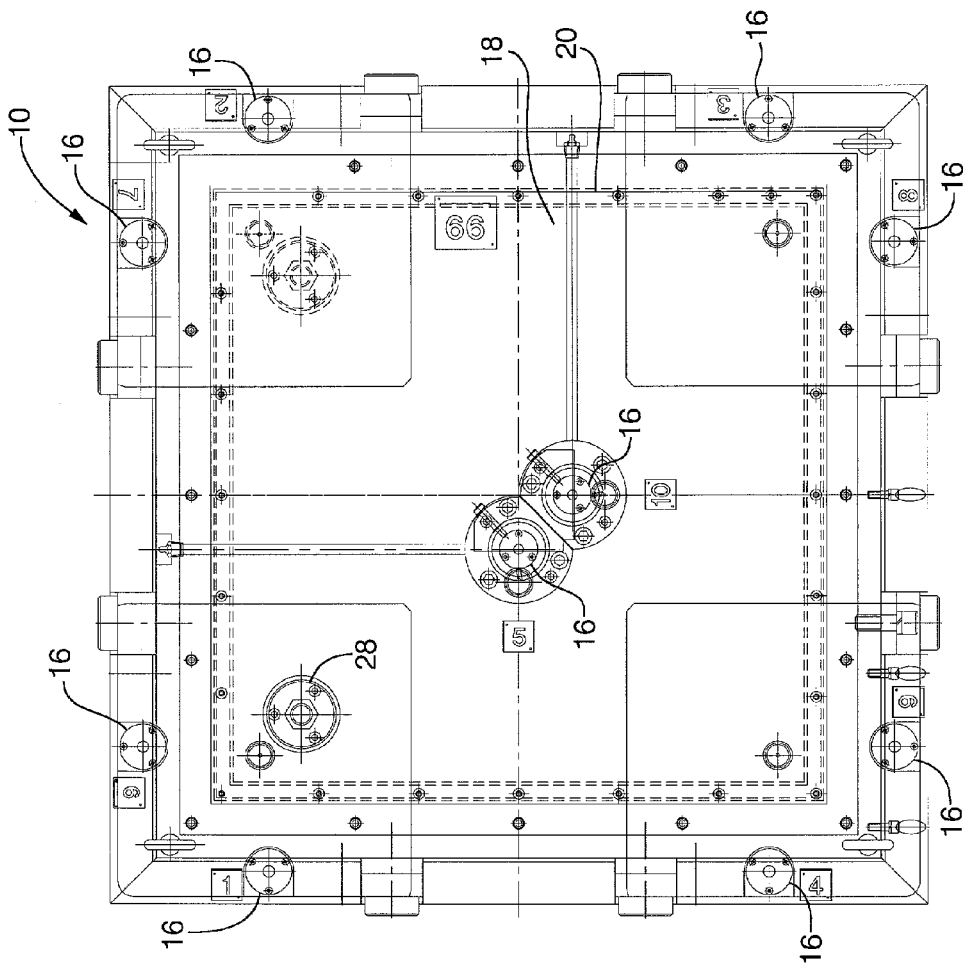
FIG. 1 is a schematic plan view of a test pallet of the present invention.

As illustrated in FIGS. 1 and 2, an apparatus described as a test pallet 10 is shown. The test pallet 10 is configured like a production pallet, in that they are the same shape and size so that the test pallet interfaces in a like manner with a clamp registry 11 of a machining station 12. The test pallet 10 has clamp positions 14 in the same locations as the production pallet for clamps of the clamp registry 11 to hold the pallet. To distinguish the test pallet 10 from a production pallet, the test pallet is a "smart" pallet since it is capable of recording one or more, and preferably all of the clamping loads within a station and at each station of a transfer line. The test pallet 10 has a load cell 16 installed at each of the clamp positions 14 to measure the clamping force generated at the registries.

A data acquisition collector 18 is included on-board the test pallet 10 to store the clamping force data collected at each station 12. The onboard collector 18 may be a computer or simply a data storage device, which may be powered by a rechargeable battery such as a twelve volt gel cell battery. The collector 18 is preferably enclosed in a case 20 where the coolant humidity may be controlled by a moisture absorbing sack (not shown).

The test pallet 10 has a dedicated pallet number or code which when communicated to the machining station 12, such as by the operator entering the number into the station controller or machine controller, signals it not to perform machining operations while this pallet is clamped in position at any station.

Figure 3:
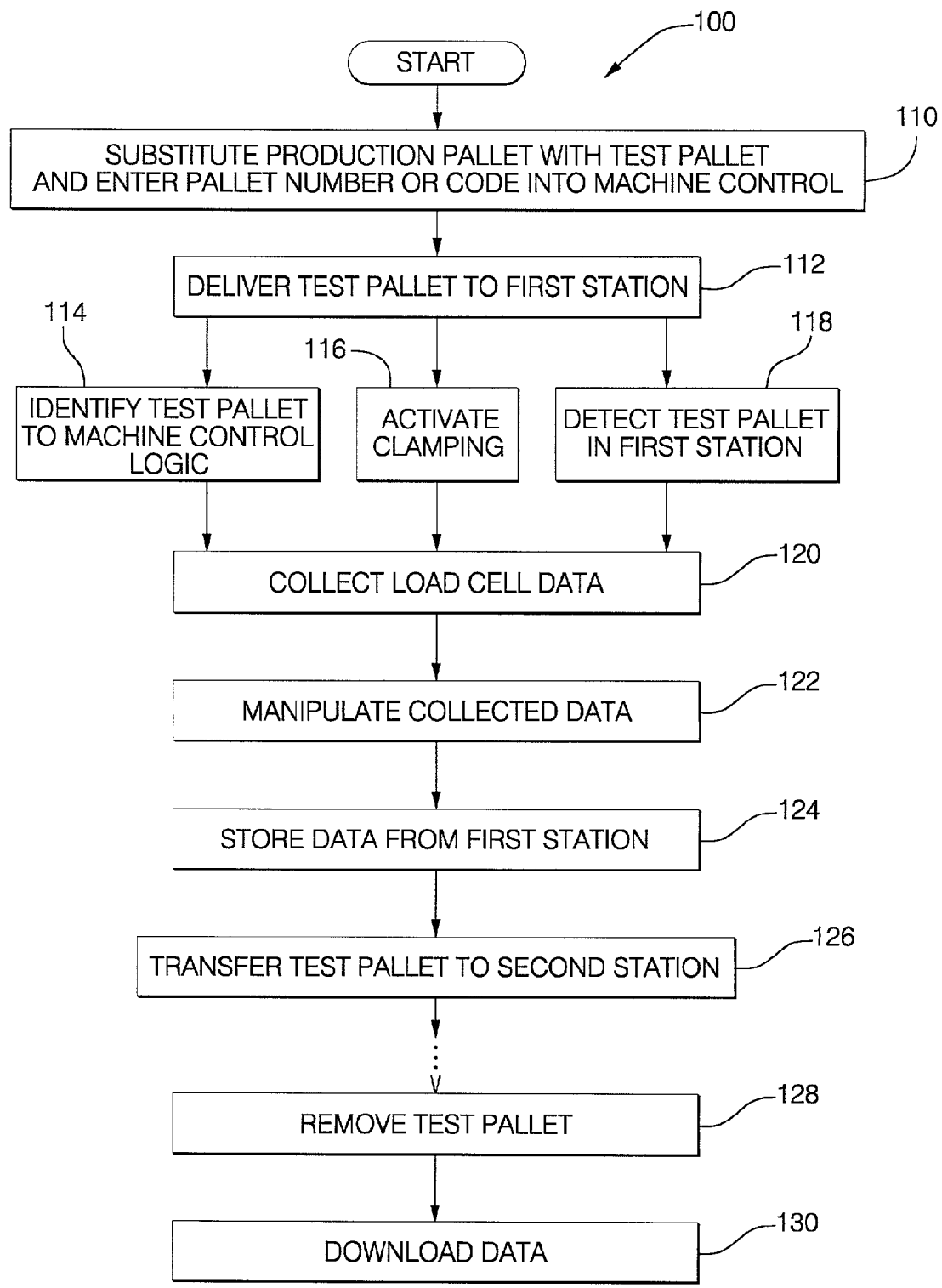
FIG. 3 is a flow chart of the method of the present invention.

A method 100 for using the test pallet 10 as part of a maintenance procedure is depicted in the flow chart of FIG. 3. During regular production, the first step 110 is to remove the production pallet from the transfer line and replace it with the test pallet. The test pallet 10 is placed on a transfer bar 22, which lifts and carries the pallet from station to station. The test pallet is delivered to the first station in step 112 where it is identified as a test pallet and not a production pallet. The pallet test code signals to the station controller not to proceed with the machining operation normally performed there in step 114.

Delivery of the test pallet initiates clamping of the test pallet in step 116. Clamping may be initiated in one of several ways. For example, mechanical linkages may drive the clamping action through the positioning of the transfer bar. As the transfer bar indexes, splined shafts linked between the transfer bar and clamp registry, actuate the clamping action. With hydraulic actuation, a signal is sent to the hydraulic valves when the transfer bar is ready to index the pallet. The clamps are aligned to register on the respective load cell on the test pallet.

Locating pins 24 on the transfer bar 22 extend into bushings 26 on the pallet to maintain pallet position during the transfers. Delivery of the pallet to the station is sensed in step 118 when the transfer bar separates from the pallet and the locating pins exit the pallet bushings. The withdrawal of the locating pins may be detected by a proximity switch 28 located on the test pallet in one of the bushings. Any type of switch may be used to detect or monitor when the transfer bar separates from the pallet. The proximity switch detects the ferrous locating pin and when the switch no longer detects the presence of the pin, the assumption is that the transfer bar has deposited the test pallet at the station. Alternatively, sensing the delivery of the test pallet in step 118 by detecting separation of the transfer bar may also be achieved with an LVDT mechanical distance switch or other means to detect the changing distance between the transfer bar and the pallet.

It is preferred that coolant continue to cycle through the station both to flush the pallet registries as well as to flush where machining chips would collect. This results in minimal disruption to the production cycle as shut off provisions would be required to stop coolant flow through the machine. Therefore the test pallet and its electrical components need to be robust enough to be submerged and operate in the coolant environment.

When the proximity switch detects withdrawal of the transfer bar, the proximity switch signal is sent to the test pallet on-board data collector. The on-board data collector may begin immediately, or wait for a time period such as 5 seconds, after receiving a signal from the proximity switch, to begin collecting data from each of the test pallet load cells. This delay accounts for the time for the pallet to be clamped. Data may be collected continuously or at discrete time intervals in step 120. The data collector may store all of the data collected from each load cell. Alternatively to conserve on data storage, logic may be employed to eliminate some of the highest and lowest readings and then averaging the remaining readings, assuming a normal distribution of data in step 122. This averaged load reading is then stored for each of the clamp positions in step 124. Initiating the data collecting process may also be done externally or remotely such as through RF technology.

When the regular production interval for the pallet is complete at the first station, the transfer bar and locating pins engage the test pallet, and lift and carry it to the next station in step 126. The data collection process (steps 116–124) is continued for each of the transfer line stations. When the pallet has cycled through the entire transfer line, the test pallet is removed in step 128. The data is extracted from the on-board data collector in an electronic format such as ASCII and may be downloaded to an off-board computer in step 130. The data may be analyzed for diagnosis of clamps which are not holding within the required tolerance. The method 100 provides a quick and objective way of identifying clamping issues without undue disruption to the production cycle.

This method has been described with respect to a lift and carry transfer line, but it is equally applicable to non-lift and carry transfer lines, such as CNC machining centers where parts are clamped for high volume, multi-machine operations or in instances where the part itself is directly transferred from station to station. For example, an engine block is not transferred with a pallet and is therefore directly clamped at each station. To apply the method to this scenario, a test part, not a test pallet, is equipped with load cells at the clamp portions and an on-board data collector. The test part is substituted in place of a production part to measure clamping loads at each station. Load data is collected from each clamp for each station. This data may then be downloaded and analyzed for non-compliant clamps.

The method and apparatus may be used as part of a preventative maintenance schedule to predict possible degradation in the clamps by generating a historical summary of the clamp's performance. Clamps or their source of clamping force may be repaired to replaced before the clamping force falls outside the required or specified clamping range. This will ensure that production parts are machined consistently to specification. It is a fast and accurate method as it only requires the production cycle time plus the time to install and remove the test pallet, while providing complete and objective data.

The invention claimed is:

1. A method for monitoring clamping loads used to clamp the clamp portions of a production part in position in a machining fixture, comprising the steps of:
   substituting a test part for the production part wherein said test part is configured with sufficient size and shape so that the test part interfaces in a like manner as a production part in position in the machining fixture and includes at least one clamp portion in the same location as a clamp portion on said production part and wherein a load cell is installed at said at least one damn portion;
   clamping said test part with a clamp at said at least one clamp portion of said test part; and
   collecting and recording data from said load cell.

2. A test pallet to substitute for a production pallet having a clamp portion located thereon in a station for machining comprising:
   said test pallet configured with a clamp portion like said production pallet and with sufficient size and shape so that the test pallet interfaces in a like manner with a clamp registry of the station for machining but distinguished from said production pallet by being capable of recording data;
   said clamp portion on said test pallet being in the same location as the clamp portion on said production pallet;
   a load cell installed at said clamp portion on said test pallet; and
   an on-board data acquisition collector.

3. The test pallet, as defined in claim 2, further comprising a test code operable to communicate at said station not to proceed with said machining there.

4. The test pallet, as defined in claim 2, further comprising a proximity switch to detect when said test pallet is in position and ready to record load cell data.

5. The test pallet, as defined in claim 2, further comprising a case enclosing said on-board data acquisition collector.

6. The test pallet, as defined in claim 2, wherein said on-board data acquisition collector is operable to store load cell data and download the data in an electronic readable format.

7. A method for monitoring clamp loads used to clamp a production pallet in position for at least one matching station, comprising the steps of:
   substituting a production pallet with a test pallet;
   detecting when said test pallet is at the machining station and ready to record load cell data;
   clamping said test pallet at at least one clamp portion having a load cell installed thereto; and
   collecting and storing load data from said load cells.

8. The method as defined in claim 7, further comprising the step of:
   signaling to the machining station not to proceed with a matching operation when test pallet is clamped.

9. The method as defined in claim 7, further comprising the steps of:
   manipulating the collected load data; and
   storing a representative load reading from each of said load cells.

10. The method as defined in claim 7, further comprising the steps of:

transferring said test pallet to a second machining station;

collecting clamping load data from a clamp of said second machining station; and storing said load data of said second machining station along with said load data from the previous machining station.

11. A method for monitoring clamp loads used to clamp production pallets in position in a transfer machining line, comprising the steps of:

substituting a test pallet for a production pallet during a production cycle wherein said test pallet includes at least one load cell located at a respective clamp portion;

placing said test pallet on a transfer bar which lifts and carries said test pallet from station to station;

separating said transfer bar from said test pallet when said test pallet is delivered to a first machining station;

clamping said test pallet with a clamp at said clamp portion;

detecting when said transfer bar has separated from said test pallet;

collecting and storing data from said load cell.

12. The method as defined in claim 11, wherein the step of detecting when said transfer bar separates from said test pallet is accomplished by a proximity switch.

13. The method as defined in claim 12, further comprising the steps of:

signaling a data collector to initiate data collection from said load cells after said proximity switch detects said transfer bar has separated from said test pallet.

14. The method as defined in claim 11, further comprising the steps of:

signaling to the machining station not to proceed with a machining operation once said test pallet is clamped.

15. The method as defined in claim 11, further comprising the steps of:

transferring said test pallet to a second machining station;

collecting load cell data from said second machining station; and storing said second machining station data along with said previous machining station data.

\* \* \* \* \*